Sept. 14, 1926.

A. F. MOYER 1,599,582

SLIDE RULE FOR DETERMINING BALANCE

Filed May 2, 1924

Inventor
AMOS F. MOYER
By Paul Paul & Moore
Attorneys

Patented Sept. 14, 1926.                                          1,599,582

UNITED STATES PATENT OFFICE.

AMOS F. MOYER, OF MINNEAPOLIS, MINNESOTA, ASSIGNOR TO PRECISION BALANCING MACHINE COMPANY, OF MINNEAPOLIS, MINNESOTA, A CORPORATION OF MINNESOTA.

SLIDE RULE FOR DETERMINING BALANCE.

Application filed May 2, 1924. Serial No. 710,547.

The slide rule of my invention is adapted for use with a balancing machine or apparatus in which there is proportionality between amplitudes of vibration and quantities of unbalance, and with which quantities of correction are measured for application in transverse planes of the work. Although the examples cited for computation represent data such as pertain to measurements for corrections to be applied in two arbitrarily selected planes for the simultaneous establishment of static and dynamic balance, the same instrument might be used with a machine which measured static balance separately from dynamic balance.

The instrument consists of a slide rule adapted to the calculation of balancing quantities where proportionality of amplitudes of vibration to quantities of unbalance is obtained, thus affording a direct and invariable procedure for the production balancing of duplicate parts without the necessity of mental computation on the part of the operator.

In the accompanying drawings forming part of this application,

Figure 1:
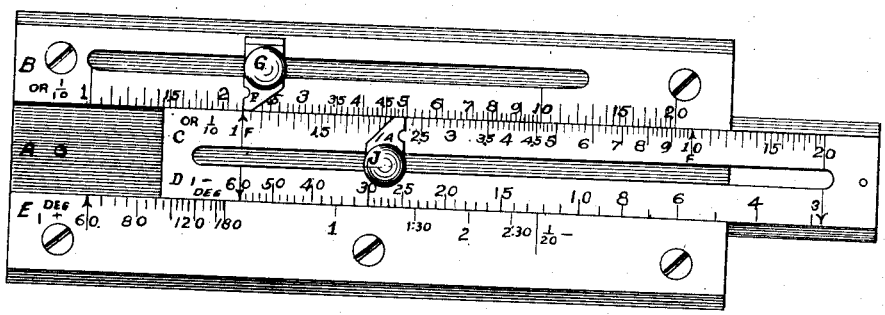
Figure 1 is a face view showing the slide rule in position for multiplication as required in the process employed for determining the amount of unbalance.

The slide rule consists of a back plate A upon which are mounted in fixed position, scale plates B and E, between which are slidably retained the double sliding scale members C and D, which are of one piece. Slidably engaged in the slot of scale member B is index F, which can be locked in any desired longitudinal position by means of screw G and sliding nut H. Also slidably engaged in the slot of scale members C and D is index I* which can be locked in any desired longitudinal position by means of a screw J and sliding nut K.

In the determination of amount and position of unbalance from proportionality of vibration amplitudes, the following steps are necessary: (1) Calibration of the set-up, or determination by trial of the proportionate relation between amplitude of vibration and quantity of unbalance. Since quantities of unbalances are expressed as the combination or product of weight times radial distance from the rotational axis, or the equivalent, in such unit, for example, as the ounce-inch, the proportionate constant or calibration factor would accordingly be expressed in ounce-inches (or other units) of unbalance per division of amplitude scale reading (or vice versa). (2) Observation of the vibrational amplitude induced by the previously unmeasured test body. (3) Multiplication of the observed number of amplitude scale divisions by the previously established calibration factor (or division if reverse relations were used in 1), resulting in the number of ounce-inches (or other units) of unbalance which exist in the test body. (4) Application at an arbitrary angle of a quantity of unbalance equal to that existing in the test body. (5) Observation of the vibrational amplitude resulting from the combination of the unbalance in the test body with the applied quantity of equal magnitude. (6) Division of the second observed number of amplitude scale divisions as divided by the first observed number of amplitude scale divisions as divisor giving a ratio equal to the ratio between the resultant or combined amount of unbalance and the amount of unbalance in the test body. (7) Reference to the fixed mathematical relation between this ratio and varying angular displacements of one quantity from the other, resulting in determination of the angular distance required for the applied quantity to be moved in order to exactly counterbalance the unbalance in the test body; the determination then being complete as to the amount and position of unbalance existing in the test body, save that only trial will indicate whether the determined angle is to be moved to the right or to the left from the initial arbitrary point.

The aforesaid fixed mathematical relation between the ratio of combined amount to amount of unbalance in the test body, and the angular displacement of one quantity from the other is mathematically expressed as $R = 2 \cosine \frac{1}{2}(180° - A)$, where $R$ is the ratio stipulated and $A$ is the angle through which the applied quantity should be moved in order to counterbalance errors in the test body.

Since step 3 in the above described determination of unbalance consists in multiplication and step 6 consists in division, the slide rule is provided with two duplicate logarithmic scales, adapted to multiplication or division, and typical of conventional slide rules save only that the length of the scale may be made to read numerically to approximately the same limit as the scale divisions on the vibration amplitude indicator of the balancing machine; for example, reading directly from 1 at the left end to 20 at the right in place of the conventional 10 or 100 at the right. The linear distance from the left end of these scales is for each graduation proportionate to the logarithm of the corresponding number, and since the logarithm of one is zero, the graduation for number 1 is at the extreme left, while the graduation for number ten is at a convenient distance taken as unity in locating all other graduations, since the logarithm of ten is one.

Multiplication by logarithms is accomplished by adding the logarithms of the numbers to be multiplied, and obtaining the number of which this sum is the logarithm. With the slide rule, multiplication is accomplished by placing the end of the sliding scale opposite one of the numbers, on the fixed scale; and opposite the other number, on the sliding scale; the act of thus placing the scales, in fact adding the two logarithms, enabling the corresponding number or product to be read directly. Since in step 3 previously described, the observed number of amplitude scale divisions is to be multiplied by the previously established calibration factor, one of the aforesaid scales of the slide rule, preferably the fixed or upper scale B in Figure 1, is provided with an index F which is adjusted and locked at the position of the constant calibration factor by which the ampliture reading is to be multiplied. The upper sliding scale C is in like manner provided with a movable index $I^a$, which for each determination is set to the number on scale C corresponding to the amplitude reading observed in aforesaid step 2. When the sliding scale C is then set so that the upper left graduation, marked 1 F is in line with index F, the number on the upper scale in line with index $I^a$ is the required product, and the number of ounce-inches (or other units) of unbalance which are to be applied in the above described step 4. An example is shown in Figure 1, where the fixed calibration factor is 2, 2, the first amplitude reading 2.3, and the product is 5, representing the amount of unbalance in the test body, and to be arbitrarily applied.

Division by logarithms is conversely accomplished by subtracting the logarithms of the divisor from the logarithm of the dividend. With the slide rule, the number of the divisor on the sliding scale is set opposite the number of the dividend on the fixed scale, and the reading on the fixed scale in line with the end of the sliding scale is the required quotient or ratio; the act of thus placing the scales, in fact subtracting the two logarithms. Since the index $I^a$ was previously set on the upper sliding scale C at the first amplitude reading, which is the divisor, the division required in step 6 will be accomplished by next moving the sliding scale C until index $I^a$ is in line with the second amplitude reading, or dividend, on the upper fixed scale B. The quotient, or ratio, can then be read from the upper fixed scale B opposite the end of the sliding scale C.

Figure 2:
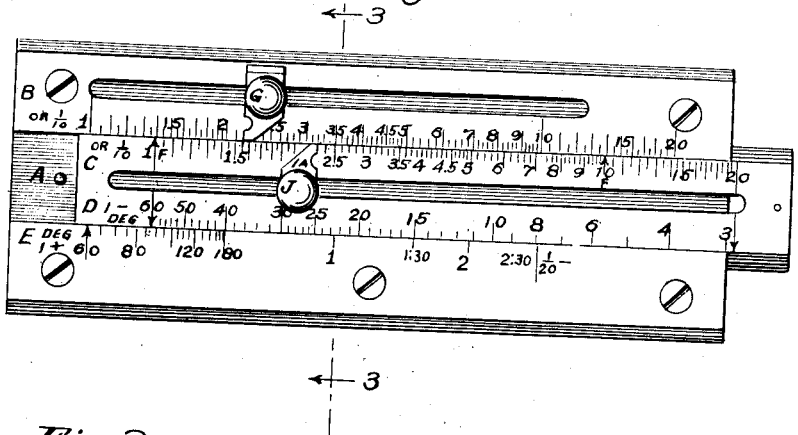
Figure 2 is a similar face view showing the slide rule in position for division and angle determination.
Figure 3:
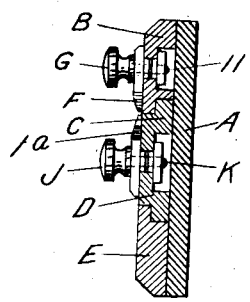
Figure 3 is a sectional view of either Figure 1 or Figure 2.

Figure 2 illustrates this step for the example shown in Figure 1. After arbitrary application of 5 ounce-inches of unbalance as indicated by the computation of Figure 1, the second amplitude reading was, for example, 3.2 and Figure 2 shows that the ratio between the first ampliture of 2.3 and the second amplitude of 3.2 divisions is approximately 1.4, as read on the upper scale V above 1 F at the end of the sliding scale C.

Since the characteristic of the logarithm is the same for all multiples of a number by ten, a logarithmic scale representing all characteristics is complete when showing values from one to ten, the same scale being applicable for values from ten to one hundred or from one-tenth to one, etc. It therefore follows that in the aforesaid values to be read opposite the end of the sliding scale C, position 10 F may be interchanged in use with position 1 F, making only a due allowance in the position of the decimal point of numerical values.

Since each value of the ratio between the said first amplitude and second amplitude corresponds to a definite angle through which the applied correction should be turned about the axis of rotation in accordance with the aforesaid equation R—s cosine ½ (180°—A), and since the linear distance from the left end of the upper fixed scale B to the reading in line with 1 F or 10 F on scale C, in reading the aforesaid ratio is proportionate to the logarithm of R, a third scale or combination of scales graduated proportionately to the logarithm of the quantity; 2 cosine ½ (180°—A) may be employed for reading angles directly without referring to numerical values of the ratio R. Such a combination is provided in the slide rule of my invention, preferably in the lower scales D and E thereof, and its application in reading the angular value is illustrated in the example of Figure 2; the required angle being 88 degrees read on scale E below the left end of the lower sliding scale D, and upon actual adjustment of the angle of application, will prove correct for the example cited. Similar procedure will likewise determine the correct amount and angle necessary to balance any test body.

In the arrangement of the combination of scales denoting angular values, it will be noted that 2 cosine ½ (180°—A) has a value of one, when A equals 60 degrees, and increases to a maximum of two when the angle is increased up to 180 degrees. Accordingly, for all ratios greater than one and up to the maximum possible ratio of two, angular values may be established at the left end of the lower fixed scale E, designated 1+, and values are read from an index mark at the corresponding end of the lower sliding scale D. Likewise, for ratios less than one, and down to a minimum of the ratio between extremes of the upper scales, angular values may be laid off from the left end of the lower sliding scale D, designated 1—, and read from an index mark at the corresponding end of the lower fixed scale E. For ratios smaller than the ratio between extremes of the upper scales, where the second amplitude is so small as to be read on the upper fixed scale B multiplied ten times with respect to the first amplitude, as read on upper sliding scale C, angular values may be laid off on the right end of lower fixed scale E from a point perpendicularly opposite 10 on the upper fixed scale, and extending to the left, designated in this case 1/20—, since 20 is the highest value illustrated on the upper scale, and are read from an index mark at the right of the lower sliding scale D and in line with the highest number on the upper sliding scale C, in this case 20. In may be noted that if the above described scale 1— here shown upon D, were laid off in reversed relation from the left end of scale 1+, shown upon E and scale 1/20—, also on E, were extended to the left therefrom, that the single linear scale thus established would represent the logarithm of 2 cosine ½ (180°—A), and since this function equals zero when A becomes zero, and the logarithm is then minus infinity, it becomes impossible to delineate upon the slide rule a graduation representing zero degrees angle, although with the length of scales here shown, up to amplitude readings of 20, a graduation for 1 degree angle is included, which is a sufficiently small angle for practical purposes, and if smaller values are desired, the scales may be made numerically longer.

My invention is in no wise limited to the exact arrangement of scales here shown, and the application of equivalent logarithmic values to graduated divisions for accomplishing the same result would be included, regardless of the relative disposition of the scales or indexing devices.

I claim as my invention:

1. In a slide rule, two relatively movable scales graduated proportionately to logarithms of numbers, a separately adjustable index on each of said scales, other scales respectively fixed each to one of said relatively movable scales and logarithmically graduated according to the trigonometric function expressing angular variation between quantities of unbalance whereby each index may be separately adjusted on one of the relatively movable scales and one set to a predetermined multiplicand and the other index adjusted experimentally to a measured multiplier which multiplier may subsequently be used as a divisor into an experimentally measured dividend, the last scale giving the desired quantity of which this quotient is a function.

2. A slide rule having in combination relatively movable divisions and scales graduated proportionately to logarithms of a function of numerical ratios, other scales logarithmically graduated and relatively movable to indicate such ratios and products, and each carrying an adjustable index adapted to designate a fixed multiplicand on one of the other scales and a determinate multiplier on the other, from the product of which may be established a determinate dividend whose ratio to the previously indexed determinate multiplier equals the proportionate function of the first named scales.

3. In a slide rule with logarithmic scales adapted to show ratios of numbers, other scales logarithmically graduated to show a function of such ratio, said other scales being divided to show values for ratios greater than an assigned number upon one of the relatively movable members and values for ratios less than an assigned number upon the other of the relatively movable members.

In witness whereof, I have hereunto set my hand this 29th day of April 1924.

AMOS F. MOYER.